United States Patent
Aguayo, Jr. et al.

(10) Patent No.: US 10,163,359 B2
(45) Date of Patent: Dec. 25, 2018

(54) SYSTEMS, METHODS, AND COMPUTER PROGRAM PRODUCTS FOR STRATEGIC MOTION VIDEO

(71) Applicant: PERCEPTIONICITY INSTITUTE CORPORATION, St. George, UT (US)

(72) Inventors: Erwin Aguayo, Jr., St. George, UT (US); Robert J. Fornaro, Raleigh, NC (US); Ignacio Dominguez, Raleigh, NC (US); Mason Morris, Henderson, NC (US); Oscar Chase Wang, Raleigh, NC (US)

(*) Notice: Subject to any disclaimer, the term of this patent is extended or adjusted under 35 U.S.C. 154(b) by 218 days.

(21) Appl. No.: 15/039,325

(22) PCT Filed: Nov. 25, 2014

(86) PCT No.: PCT/US2014/067493
§ 371 (c)(1),
(2) Date: May 25, 2016

(87) PCT Pub. No.: WO2015/077795
PCT Pub. Date: May 28, 2015

(65) Prior Publication Data
US 2017/0229030 A1      Aug. 10, 2017

Related U.S. Application Data

(60) Provisional application No. 61/908,628, filed on Nov. 25, 2013.

(51) Int. Cl.
*G06F 17/21*      (2006.01)
*G09B 5/06*      (2006.01)
*G09B 7/02*      (2006.01)

(52) U.S. Cl.
CPC ............... *G09B 5/065* (2013.01); *G09B 7/02* (2013.01)

(58) Field of Classification Search
CPC ................................. G09B 5/065; G09B 7/02
See application file for complete search history.

(56) References Cited

U.S. PATENT DOCUMENTS

| 6,289,165 B1 * | 9/2001 | Abecassis | G11B 19/02 348/E5.105 |
| 7,590,997 B2 * | 9/2009 | Diaz Perez | G06Q 30/02 725/109 |

(Continued)

OTHER PUBLICATIONS

International Search Report and Written Opinion dated Feb. 24, 2015, in International Application No. PCT/US2014/067493, 11 pages.

*Primary Examiner* — Masud Ahmed
(74) *Attorney, Agent, or Firm* — Rothwell, Figg, Ernst & Manbeck, P.C.

(57) ABSTRACT

A system, method, and computer program product for presenting a video. A method of the present invention includes a link-map, where the link-map comprises one or more segments and one or more links between segments and where each link is associated with a user category. The method further includes retrieving a current segment to play for a user associated with a user category. The retrieving includes traversing a link of the link-map based on the user category. The retrieving further includes selecting the current segment to play from the plurality of segments based on traversing the link-map. The method further includes playing the current segment. The method further includes repeating the retrieving and playing steps until an end condition is reached.

22 Claims, 8 Drawing Sheets

(56) References Cited

U.S. PATENT DOCUMENTS

| | | | |
|---|---|---|---|
| 9,891,785 B2* | 2/2018 | Lin-Hendel | G06F 3/0482 |
| 2009/0263777 A1 | 10/2009 | Kohn | |
| 2010/0057644 A1* | 3/2010 | Barton | G06F 17/30817 |
| | | | 706/11 |
| 2011/0035326 A1 | 2/2011 | Sholl et al. | |
| 2011/0123972 A1 | 5/2011 | Friedman | |
| 2012/0064500 A1* | 3/2012 | Waitzkin | G09B 5/02 |
| | | | 434/350 |
| 2012/0258438 A1* | 10/2012 | Cohen | G09B 7/00 |
| | | | 434/365 |
| 2016/0014482 A1* | 1/2016 | Chen | G11B 27/031 |
| | | | 386/241 |

* cited by examiner

| Video ID # | Segment # | Title or "Keyword(s)" | Run Time | File Size |
|---|---|---|---|---|
| MVI_0998.MOV | 00.0 | Welcome Opening Instructions | 0:20 min. | 117.7 MB |
| MVI_0949A.MOV | 001.A0 | INTRO to SMV (Staff) | 2:41 min. | 869.4 MB |
| MVI_0949B.MOV | 001B.0 | INTRO to SMV (Supervisors) | 2:41 min. | 869.4 MB |
| MVI_0949C.MOV | 001C.0 | INTRO to SMV (Managers) | 2:41 min. | 869.4 MB |
| MVI_0951.MOV | 00R1.4 | Congratulations Customizes is right. | 0:14 Min. | 81.9 MB |
| MVI_0952.MOV | 001.A1 | "Manage" / "Human" / "Factors" | 0:16 Min. | 91.1 MB |
| MVI_0953.MOV | 001.A2 | "Other / "Types" / "Factors" | 0:15 Min. | 90.3 MB |
| MVI_0954.MOV | 001.A3 | "My" / "Personal" / "Factors" | 0:10 Min. | 54.6 MB |
| MVI_0955.MOV | 001.AU | "Undetectable" / Unrecognized Question | 0:23 Min. | 71.2 MB |
| MVI_0958.MOV | 001.Q | Ask if Learner has any Questions? | 0:19 Min. | 111 MB |
| MVI_0960.MOV | 001.Q1 | "Personalizes" / "Customizes" | 0:14 Min. | 83.4 MB |
| MVI_0961.MOV | 001.R1 | Sorry | 0:06 Min. | 38.2 MB |
| MVI_0963.MOV | 001.R2 | Good Try | 0:25 Min. | 145.1 MB |
| MVI_0966.MOV | 002.0 | Training Methods | 2:36 Min. | 918 MB |
| MVI_0967.MOV | 002.A1 | "Video Lectures" | 0:14 Min. | 79.3 MB |
| MVI_0968.MOV | 002.A2 | "Power Point" | 0:16 Min. | 58.1 MB |
| MVI_0969.MOV | 002.A3 | "Data" / "Information" / "Dump" | 0:16 Min. | 88.4 MB |
| MVI_0970.MOV | 002.A4 | "Group" / "Exercise" / "Exercises" | 0:16 Min. | 57.9 MB |
| MVI_0971.MOV | 002.A5 | "Online" / "Face-to-Face" / "Chat" | 0:18 Min. | 103.7 MB |
| MVI_0972.MOV | 002.A6 | "E-learning" / "E learning" / "E-leaming" | 0:27 Min. | 158.2 MB |
| MVI_0973.MOV | 002.A7 | "Memorize" / "Memorizing" / "Regurgitate" / | 0:15 Min. | 90.5 MB |
| MVI_0974.MOV | 002.A8 | "On-the-job training" / "On the job training" | 0:15 Min. | 85.9 MB |
| MVI_0975.MOV | 002.A9 | "Visual Explanation" / "Visual Explanations" | 0:26 Min. | 150.7 MB |
| MVI_0976.MOV | 002.A10 | "Card-based" / "Dialog" / "Card-based dialog" | 0:31 Min. | 182.6 MB |
| MVI_0977.MOV | 002.A11.a | "Social Networks" / "Facebook" / "networking" | 0:14 Min. | 81.0 MB |
| MVI_0978.MOV | 002.A11.b | "Business Networks" / "LinkedIn" / | 0:13 Min. | 74.4 MB |
| MVI_0979.MOV | 002.A11.c | "Communities" / "Online Communities" | 0:19 Min. | 68.6 MB |
| MVI_0980.MOV | 002.A12 | "Multimedia e-learning" / "online e-learning" | 0:11 Min. | 66.6 MB |
| MVI_0981.MOV | 002.A12.a | "Simulators" | 0:18 Min. | 105.1 MB |
| MVI_0982.MOV | 002.A13 | "Graphic Facilitation" / "Graphics" / | 0:15 MB | 91.8 MB |
| MVI_0984.MOV | 002.A14 | "Action Research" / "Action Learning" | 0:27 Min. | 95.5 MB |
| MVI_0985.MOV | 002.AU | "Undetectable" / "No Keywords Detectable" | 0:13 Min. | 48.2 MB |
| MVI_0986.MOV | 002.Q | Ask if Learner has any Questions? | 0:18 Min. | 63.8 MB |
| MVI_0989.MOV | 003.0 | SMV Solution | 1:45 Min. | 633.1 MB |
| MVI_0990.MOV | 003.AU | "Undetectable" / "No Keywords Detectable" | 0:12 Min. | 42.2 MB |
| MVI_0993.MOV | 003.A1 | "in the market" / "for sale" / "market" / sale" | 0:08 Min. | 46.6 MB |
| MVI_0994.MOV | 003.A3 | "Any Training Companies" / | 0:08 Min. | 49.7MB |
| MVI_0996.MOV | 003.Q | Ask if Learner has any Questions? | 0:14 Min. | 83.7 MB |
| MVI_0979.MOV | 003.A2 | "Buy" / "Buying" | 0:07 Min. | 44.0 MB |
| MVI_0999.MOV | 003.A4 | Session End | 0:20 Min. | 117 MB |

FIG. 4

SYSTEMS, METHODS, AND COMPUTER PROGRAM PRODUCTS FOR STRATEGIC MOTION VIDEO

CROSS REFERENCE TO RELATED APPLICATION(S)

This application is a 35 U.S.C. § 371 National Phase Entry Application from PCT/US2014/067493, filed Nov. 25, 2014, designating the United States, and also claims priority to U.S. Provisional Application Ser. No. 61/908,628, entitled "STRATEGIC MOTION VIDEO (SMV) TECHNOLOGY FOR PERSONALIZED VIDEO TRAINING (PVT), TRAINING ON DEMAND (TOD), CLOUD ONLINE TRAINING (COT) AND INTERACTIVE VIDEO TRAINING (iVT)", filed Nov. 25, 2013. The disclosures of both applications are incorporated herein in their entirety by reference.

TECHNICAL FIELD

The present invention relates generally to interactive video services. More particularly, the present invention relates to systems, methods, and computer program products for strategic motion video.

BACKGROUND OF THE INVENTION

Traditional corporate training methods rely on either in-person training, remote conferencing, or video. Each of these methods has drawbacks. They are expensive. In-person training is difficult to scale to large or geographically diverse groups. Remote conferencing and video, although somewhat easier to scale to large or geographically diverse groups, is difficult to customize to individual needs and cannot change dynamically to respond to learner progress.

It is appreciated that training by a subject-matter expert is preferred. It is also appreciated that customized, individual training, where a learner can actively engage in question-and-answer sessions, is preferred. However, none of the existing methods of training can achieve these goals in a cost-effective, scalable manner. Thus, there is a need for a system, method, and computer program product that provides interactive video services.

SUMMARY OF THE INVENTION

The present invention is directed to systems, methods, and computer program products for presenting a video. The video is tailored to a specific user or user category and may respond to user questions.

Particular embodiments of the present invention are directed to systems, methods, and computer program products for personalized video training (PVT), Training on Demand (TOD), Cloud Online Training (COT), and Interactive Video Training (iVT), using Strategic Motion Video (SMV).

In one particular embodiment, a method for presenting a video uses a link-map comprising a plurality of segments and a plurality of links between segments, where each link is associated with a user category. The method further comprises retrieving the current segment to play for a user associated with a user category. The retrieving comprises traversing a link of the link-map based on the user category. The retrieving further comprises selecting the current segment to play from the plurality of segments based on traversing the link-map. The method further includes playing the current segment. The method further includes repeating the retrieving and playing steps until an end condition is reached.

In some embodiments, retrieving the current segment to play further includes detecting a user-initiated question. The detection of the user-initiated question may, in some embodiments, occur because the user initiated a question mode, for example by hitting a "Q" key or by saying "Question" in a microphone. The detection of the user-initiated question may also occur by using speech recognition and natural language processing techniques to determine that the user-initiated question is actually a question. In this embodiment, retrieving the current segment to play further includes selecting a segment to play responsive to the user-initiated question. In some embodiments, selecting a segment to play responsive to the user-initiated question includes performing a keyword-based search of pre-recorded segments of answers to anticipated questions. In some embodiments, more sophisticated natural language processing and artificial intelligence techniques are used to determine the responsive segment. In this embodiment, retrieving the current segment to play further includes playing the responsive segment.

In some embodiments, playing the current segment includes detecting a user-initiated question at a location within the current segment. Playing the current segment further includes determining an interrupting segment to play responsive to the user-initiated question. Playing the current segment further includes playing the interrupting segment. Playing the current segment further includes resuming playing the current segment at the detected location.

In some embodiments, retrieving the current segment to play includes receiving the user's response to a system-initiated question, where the system-initiated question was programmed into the link-map. Retrieving the current segment to play further includes selecting a segment to play based on a user response. In some embodiments, the determined segment to play is a pre-recorded answer to an anticipated question.

In some embodiments, retrieving the current segment to play includes determining dynamically that a system-initiated question should be played, where the system-initiated question is not programmed on the link-map. Retrieving the current segment to play further includes playing the system-initiated question. Retrieving the current segment further includes receiving a user response to playing the system-initiated question. Retrieving the current segment further includes determining a segment to play based on the user response.

In some embodiments, the system-initiated question is an assessment test. In some embodiments, determining dynamically that a system-initiated question should be played is based on a user session, including the number and content of any user-initiated questions, responses to any system-initiated questions and test, and any user-specific settings. In some embodiments, user-specific settings may include a learning style, a preference for level of interaction with the system, specific subject matter of interest, and so on. In some embodiments, the dynamic determination is further based on a history of previous user sessions. In some embodiments, the dynamic determination is based on how recently the subject matter of the question was presented to the user, in order to facilitate memorization. In some embodiments this may include asking questions from previous segments or even previous sessions.

In some embodiments, selecting the segment to play based on the user response includes selecting a follow-up system-initiated question to be played. For example, the response may indicate that the user did not understand the question, or the response may not have provided enough information to the system. In some embodiments, selecting the segment to play includes selecting a segment related to the user response. For example, if the user response indicated limited understanding then another segment explaining the subject matter might be played; alternatively, if the response indicated better understanding, then a more advanced segment could be played. In some embodiments, selecting the segment to play includes selecting a segment based on traversing the link-map for the user category. For example, the link-map could be followed at the point where the system-initiated question was first determined.

In some embodiments, playing the current segment includes streaming the segment online. In some embodiments, the user category is based on one or more of an employment role, a seniority level, a subject-specific experience level, a history of job-training, and a learning style. In some embodiments, one or more of the plurality of segments includes one or more of special effects, graphs, images, and animations.

In some embodiments, the end condition is programmed on the link-map. In some embodiments, the video to be presented is a Strategic Motion Video (SMV) and the link-map is an SMV link-map.

In one embodiment, a device for presenting a video using a link-map, wherein the link-map comprises a plurality of segments and a plurality of links between segments, wherein each link is associated with a user category, comprises a processor, a memory coupled to the processor, and a network interface coupled to the processor. The processor is configured to retrieve a current segment to play for a user associated with a user category. The retrieving comprises traversing a link of the link-map based on the user category. The retrieving further comprises selecting the current segment to play from the plurality of segments based on traversing the link-map. The processor is further configured to play the current segment. The processor is further configured to repeat the retrieving and playing steps until an end condition is reached.

In one embodiment, a non-transitory computer program product for presenting a video using a link-map, wherein the link-map comprises a plurality of segments and a plurality of links between segments, wherein each link is associated with a user category, comprises a non-transitory computer readable medium storing computer readable program code embodied in the medium. The computer program product further comprises program code for retrieving a current segment to play for a user associated with a user category, the retrieving comprising traversing a link of the link-map based on the user category and selecting the current segment to play from the plurality of segments based on traversing the link-map. The computer program product further comprises program code for playing the current segment. The computer program product further comprises program code for repeating the retrieving and playing steps until an end condition is reached.

BRIEF DESCRIPTION OF THE DRAWINGS

FIG. 4 presents a table showing a video segment play list according to an exemplary embodiment of the invention.

DETAILED DESCRIPTION

Figure 1:
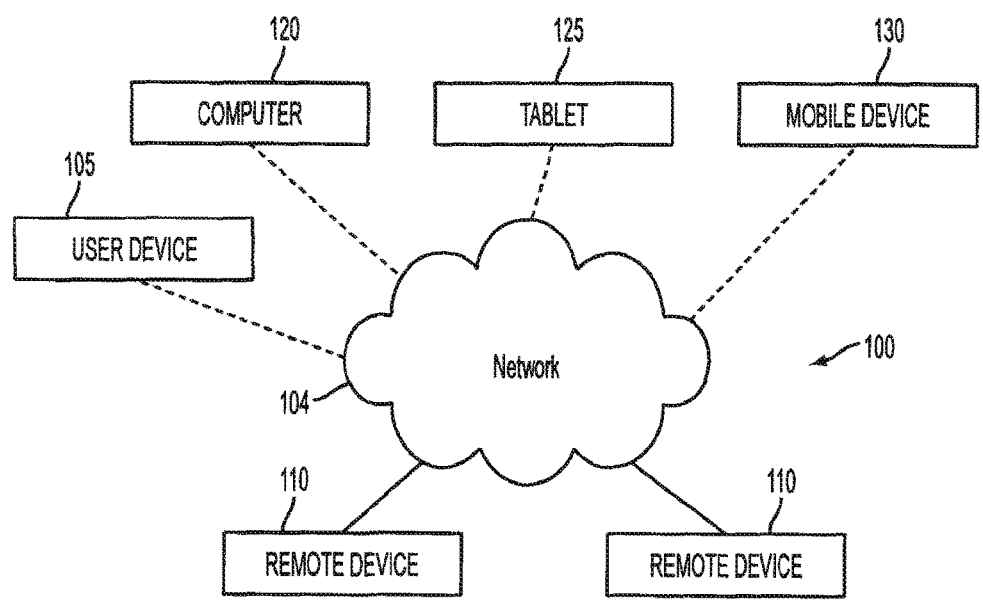
FIG. 1 illustrates an exemplary architecture of a video presentation system in accordance with exemplary embodiments of the present invention.

Referring now to FIG. 1, an exemplary architecture of a video presentation system in accordance with embodiments of the present invention is illustrated. System 100 includes at least one remote device 110 that is configured to communicate with one or more user devices 105 through a communications network 104 (e.g., the internet). Examples of user devices include a computer 120 (e.g., laptop or desktop), a tablet 125 (e.g., an iPad), and a mobile device 130 (e.g., a smartphone, such as, for an example, an iPhone). An example of a remote device 110 includes a server. The system, method and computer program product of the present invention can, for example, be deployed as a user/client-server implementation, as an ASP model, or as a standalone application running on a user device 105.

The user device 105 can be configured to communicate with one or more remote devices 110 via the network 104. Remote devices 110 are configured to generate, maintain, and host the computer program product in one embodiment. The remote devices 110 generate, maintain and host web pages (e.g., HTML documents) that embody the present invention. The remote devices 110 include services associated with rendering dynamic web pages, such as data storage services, security services, etc. Accordingly, remote devices 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Remote devices 110 may be coupled with a data storage facility, which may include one or more local or remote memory systems or units, and can include one or more databases and/or file systems for storing data, media, graphics, HTML documents, XML documents, etc.

Remote devices 110 can be configured to include an admin function, which enables an administrator to perform system-related functions. The system-related functions can include maintaining user records, performing upgrades on the software and topic content, and the moderation of tasks.

Figure 2:
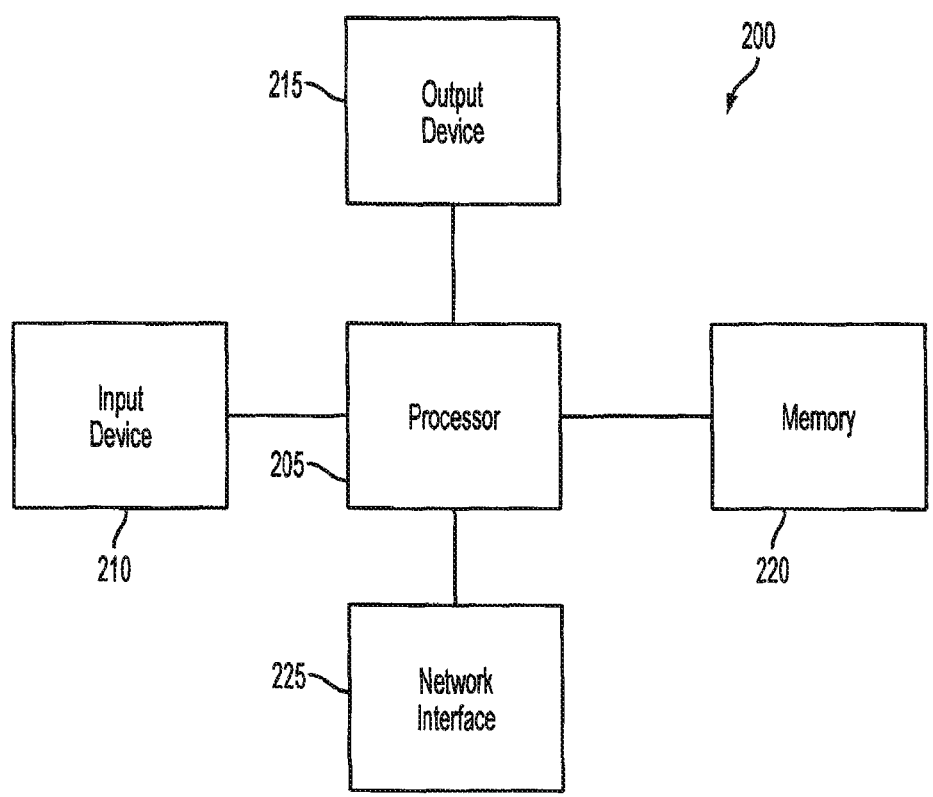
FIG. 2 is a block diagram of a user device in accordance with exemplary embodiments of the present invention.

Referring to FIG. 2, a block diagram of a device 200, such as for example, user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a DVD), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
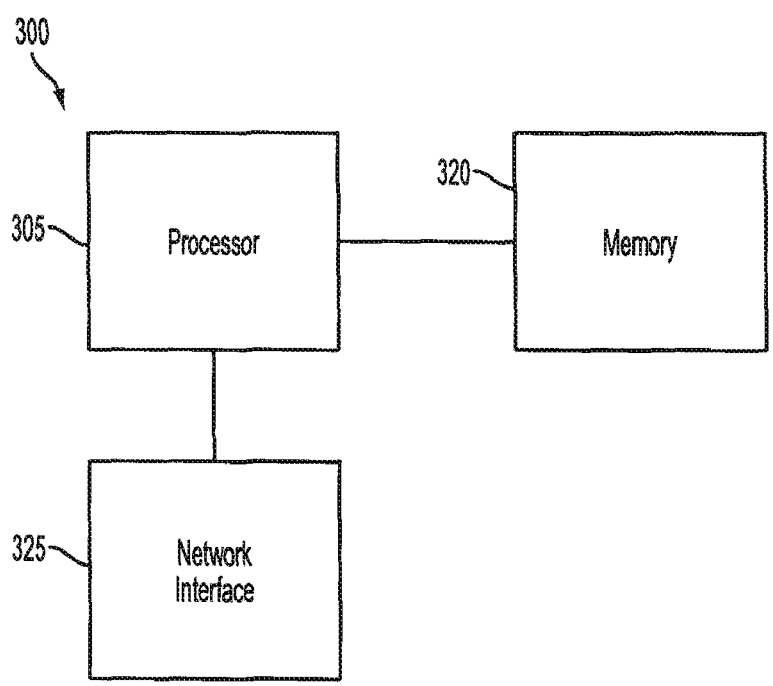
FIG. 3 is a block diagram of a remote device in accordance with exemplary embodiments of the present invention.

Referring now to FIG. 3, a block diagram of a remote device in accordance with exemplary embodiments of the present invention is illustrated. As shown in FIG. 3, the remote device 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305. Processor 305 controls the operation of network interface 315 and memory 310 and the flow of data and functionality between them. In various embodiments inputs can come from the device 200, to the remote device 300, via the network interface 315. Processing can occur at the remote device 300, at the device 200, or at both. In various embodiments, remote device 300 may be a server.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where remote device 300 includes a microprocessor, computer readable program code may be stored in a computer readable medium, such as, but not limited to magnetic media (e.g., a hard disk), optical media (e.g., a DVD), memory devices (e.g., random access memory, flash memory), etc. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

The present invention is an enhanced video data management and control technology that uniquely enables instantaneous delivery of high-resolution interactive full-motion digital video programs for online "personalized" video training (PVT), training on demand (TOD), Cloud video training, interactive video training (iVT) and other interactive video services. An embodiment of the system provides for two-way dialog discussions between users/learners and the "characters" of the video content. Video programs can be delivered through any form of Digital Wireline and/or Digital Wireless Communications networks without the need and use of extensive bandwidth and video streaming capacity. The name "Strategic Motion Video" (SMV) itself describes several of the invention's purposes and its function of providing ways and means to identify needed data and set strategic patterns in the acquisition of user data and then linking user data to relevant personalized training data. Embedded within the SMV technology are a plurality of dynamic techniques and processes. SMV technology transforms the conventional "instructor-led" training process from a physical face-to-face domain to an interactive virtual video/data domain. Beyond this transformation from a face-to-face domain to a virtual video/data domain the technology mirrors the intellectual behavior of an instructor by making dynamic assessments of the answers learners provide to questions the instructor asks the learner or the learner asks the instructor.

Comprising the invention are some properties found in the Inventors' previously filed Distributed Video Segment Microcasting (DVSM) technology, as described in U.S. Patent Publication No. 200210013948, the contents of which are incorporated in their entirety herein; specifically but not limited to (i) video file sectoring techniques that facilitate video data storage; (ii) ubiquitous transportation and high speed delivery of large video files; (iii) multi-level filtering and decision making processes leading to a plurality of data assignment techniques that coordinate critical user and video data; (iv) a formatting process were digital videos are divided into video scenes (VS) of variable length; (v) These video scenes are further divided into video segments of fixed or variable length; (vi) A video segment (VSG) header and VS attributes (such as flags, tags, marks, compression type and content rating, etc.) are attached to each video segment facilitating the storage and transmission of the formatted segments; and (vii) a plurality of data insertion processes that insert assigned user data into video data segments. The SMV processes and techniques that advance and enhance the DVSM system are: (viii) a plurality of dynamic means to match specific questions asked by instructors, subject matter experts (SME) and training facilitators represented within the video content as characters and/or users/learners to specific answers provided by the instructors/subject matter experts and/or users/learners often referred to as Q&A; (ix) zero editing (as defined by the invention) video assets acquisition techniques that eliminate or at a minimum mitigate the need for traditional video editing; and (x) on-the-fly methods and techniques used to interrupt the transmission of a video segment, insert and transmit another video segment or a plurality or sequence of video segments then restart the original video segment at the point at which it was interrupted.

Embodiments of the SMV invention provide for a plurality of administrative users including but not limited to professional training and business personnel, such as corporate training designers, subject matter experts, training instructors, training facilitators, system administrators, database managers, training video and video production personnel, as well as advertising and marketing designers and developers, and specifically learners, and consumers of educational and learning products, programs and services. In some embodiments, users may access the features through the use of a plurality of dashboards presently identified as, but not limited to, a Learner Dashboard (LD), an Administrator Dashboard (AD), and a Production Dashboard (PD). These dashboards facilitate users' varied activities necessary to create learning or marketing content, management of data and reporting activities and consume, read or and otherwise "interact directly" with the content as required to acquire the knowledge presented in the content to achieve whatever learning or informational objectives resident in the content and as prescribed by the training course.

Strategic Motion Video provides corporations, SMEs, corporate training designers, corporate training facilitators, corporate training video producers, HR professionals and any others who practice the art of corporate (generic, cross-functional, and/or leadership), product and technical training.

Training employees is an expensive proposition. According to a 2006 research article in the Employee Development Survey Report, published by the Society for Human Resource Management (SHRM), in 2004, the average annual expenditure was $955 per employee. (SHRM 2006 article endnotes: Esen, E., & Collison, J. (2005). *Employee development survey report* Alexandria, Va.: Society for Human Resource Management. SHRM HR metrics toolkit, Sugrue, B., & Rivera, R. J. (2005) *State of the industry: ASTD's annual review of trends in workplace learning and performance*. Alexandria, Va.: American Society for Training and Development.) This number balloons, as hiring, turnover and other less obvious costs associated with how employees get trained are included.

Consider this fact, one-year after this SHRM Employee Development Survey Report was published; Training magazine reported that companies spent an average of $1,220 annually per employee in 2007. Depending on what costs are comparatively included that is a 25% increase for employee training in one year. It is easy to expect that the higher cost of $1,200 would prevail if the factors for each study were identical. SHRM also wonder what costs will be in 2013, as well as moving forward.

Companies, institutions and organizations are finding a growing need to discover ways, at a minimum, of maintaining training costs level or reduce them if possible. Of course the need for employee training is rising as more workplace technology is universally reaching business and organizations. New or advancing workplace technologies make the possibility of maintaining or reducing training costs very challenging. Good evidence of there being a priority need for universally finding new ways to develop, conduct and deliver training within new corporate training models designed to reduce costs for training in the workplace is the present unemployment situation.

Unemployment is hovering around 7.2-7.8%, yet we have about 3.2 million open jobs. ("Need Work? US Has 3.2 Million Unfilled Job Openings'" by Brain Sullivan, published by CNBC, 10 Oct. 2011.) There are lots of reasons for this phenomenon. Such things as, long-term unemployment is killing skills, a poor housing market hurting labor mobility, and, maybe just maybe, extending unemployment benefits.

Matching talents to positions has always been a problem and stands to soon become a looming crisis as new types of jobs in response to technology growth are created. In the same footnoted of the CNBC article it can be read, 'Siemens' Peter Solmssen says he has 3,000 job openings in America he's having trouble filling. Cummins CEO Tim Solso told CNBC back in June that he couldn't find skilled workers for his manufacturing plants. And, 'When CNBC asked, Air Power Systems CEO Larry Mocha if he was having trouble finding skilled workers he responded, "That's the biggest problem we've got."'

Costs associated with corporate training are only half of what impacts businesses' training investments and profits. According to estimates of the Alliance for Excellent Education, a national policy, research and advocacy organization, if the students who dropped out of the high school class of 2007 had graduated, it would add $329 billion to the U.S. economy over their lifetimes. This economic impact directly related to high school drop out rates is a loss for all businesses.

More immediately, the over one (1) million high school kids that drop out lack the skills to fill most entry-level jobs employers need to fill. If businesses were to take on this additional responsibility of educating high school dropouts to minimum or hirable standards, corporate training costs would increase by $1.2 to $1.5 billion annually. ("Need Work? US Has 3.2 Million Unfilled Job Openings'" by Brain Sullivan, published by CNBC, 10 Oct. 2011.)

Growing training costs associated with corporate training, workforce talents that do not meet the present and future job needs of companies, and high school dropout rates are just some of the educational dynamics that support the need for the present invention.

Underlying these needs are: (i) that corporations suffer and seek relief from the inefficiencies exhibited by new and existing employees in "transference rates" at the completion of training courses or programs they provide employees; (ii) that transference rates are the behavioral measures that employers use to observed if employees have learned the subjects well enough to immediately effect job performance and these rates have not proven to be adequate; (iii) that available studies show that transference rates range from 10% to 62% in effectiveness; (iv) that at best, annually corporations lose 38% of their investments in training; (v) that the preferred best practice of corporations (by 77.4%, "Implementing and Supporting Training for Important Change Initiative," published by Training Folks and Training Industry, Inc., 2012) is to use subject matter experts as instructors when training for important change initiatives; (vi) that the Bureau of Labor Statistics estimates an approximate 150 million people are in our workforce and 11.3 million are out of work and the reality is that the training industry just does not have enough subject matter experts/instructors to retrain or train all these workers to effectively impact the transference rate of knowledge; (vii) that much of today's research shows that modern best practice focuses heavily on the "learner experience," and is highly tailored to the working environment of the employees to effect improved transference rates; (viii) that the retirement of baby boomers will cause a brain drain; and (ix) that government has decreased research spending.

In terms of training costs, SMV will significantly reduce the costs associated with instructor-led training in that it can be used to cut costs by over 73% of the existing training methods, specifically with online e-learning, and SMEs will have the ability to cost-effectively personalize training to the individual and leverage their expertise and services by extending their reach to millions of more people.

Corporate performance is driven by human capital. Presently, corporate training dollars are spent on three types of corporate training, 1) generic, 2) cross-functional, and 3) leadership. Fundamentally corporate training dollars are distributed between delivery methods of training and whatever training tools or technology associated with the delivery of these training methods. In spite of all the technological advances the basic training model hasn't changed, and neither have many of the training techniques. Employers provide employees with reading materials. They walk through procedures several times explaining each step as thoroughly as possible, and the reasoning behind each step of the procedures. Most up to date employers assign a mentor to new employees, some don't. Without a well-designed guide developed by HR professionals, facilitators, instructors, or subject matter experts for these mentors, sink or swim on-the-job training is a teaching approach that rarely works.

Classroom or Instructor-led training remains very popular for companies and trainers because it is effective, instructors can use storytelling, training sessions are interactive, and instructors can, on-the-fly, personalize the training. The technology tools used by trainers are blackboards, overhead projectors and/or PC PowerPoint@ software and videos. Video is used principally to break up lectures, to explain sections of the training topic and/or present case studies. PowerPoint presentations are used to customize group-training sessions but not customizable to the individual learner, On the other hand, overhead projectors allow instructor to write on them for easy on the spot customization.

Quizzes, small group discussions, case studies, active summaries, Q & A sessions, card-based dialog, role-playing, participant control, demonstrations, and other activities like creating a personal action plan or raising arguments are non-technology techniques subject matter experts use to keep learners engaged and having fun. Costs are instructor-led training's major disadvantage.

Computer-based training (CBT) has become increasingly prevalent, as technology is more widespread and easier to use. CBT can be used in a self-directive manner and interactively with text, CD-ROM, multimedia, and virtual reality formats. CBT can be cost-effective but suffers from becoming boring and learners have exhibited poor transference rates.

Online E-learning is fast becoming the most widely used and accepted training method and technology. According to the ASTD "State of the Industry" report, companies are using a record level of E-learning, and the ASTD predicts that number will continue to rise. Web-based training, teleconferencing or videoconferencing, audio-conferencing, distant learning, collaborative document preparation, and e-mail are the techniques most used with E-learning. This training method has many costs saving advantages beginning with reduced operating expenses and fees for SMEs. On the other hand, the major disadvantages are that E-learning is usually generic and not customized to the company or more specifically to the individual employee's needs. Self-instruction offers limited opportunities to receive context-specific expert advice or timely response to learner's questions.

Learning experts believe that there is a big advantage to blended learning in that it more closely replicates how people actually learn on the job, through experience and interaction with co-workers. A University of Tennessee study showed that a blended learning program reduced both the time and the cost of training by more than 50 percent. The same study showed a 10 percent improved result in learning outcomes compared with traditional training.

Comparatively traditional video has been used sparingly and primarily for one-way broadcast to reinforce or breakup lectures, to explain sections of the training topic and/or present case studies. Video graphics are used with simulators to provide users the opportunity to see, feel, control, and imagine the action on the screen, as experienced in the real-world.

Present day traditional video technology lacks interactive properties. Video graphics provide limited predetermined interactivity. However, in that the interactivity is in response to movement(s) or activities executed by the user while the user experiences activities or movement(s) shown on the screen the interactivity is not an intellectual exchange of ideas, concepts or questions and answers generate by the user or the onscreen SME character.

It is also costly to acquire and edit video assets with costs of upwards of $1,000 to $3,000 per finished minute for professionally shot and edited straight video. Video graphic costs are much greater than straight video production. Visual explanation is the newest use of video and it is used in conjunction with instructor-led training. It allows for ideas to be explained visually taking advantage of its natural properties of motion and sound, as well as, its FLASH or three-dimensional capabilities, and it works well with multimedia. However, here-to-fore, any interaction between the user and the video characters that affect the characters' and users' such as, learners or administrators the ability to communicate ideas, as in a normal Q&A session, has not been made or if they exist made cost effective.

Embodiments of SMV use Video Segmentation and Microcasting techniques that allow for the management of video data enabling users/learners to control the video session. In these embodiments, users can stop, pause, replay, rewind or fast-forward any segment of the video program, including a live broadcast, with a keyboard or remote control. They can also choose to view stored sub-titles for foreign video training programs in a language of their choice.

In some embodiments of the invention, SMV assigns attributes to each video segment based upon its characteristics such as the video content-type; motion content within the segment and its suitability for insertion in a specific time slot or sequence. Codes, tags and/or flags are assigned to user data, segmented content data and content video data used to automate the coordination and insertion of critical user information with video selections.

In some embodiments, SMV provides administrative users such as subject matter experts the ability to enter specific data for the purpose of personalizing data specifically relevant to how the data relates directly to the user and the content that is presented to the user, including but not limited to personal data, questions generated by the user or subject matter expert video character, answers generated by the user or subject matter expert's video character and/or other information related to the subject matter data.

Microcasting is the technical process that some embodiments of SMV use to deliver selective segments of a video program directly associated with each individual viewer's interactive request-type, stated or unstated wants, wishes, desires, psychodynamic and demographic needs.

Embodiments of the present invention of SMV cost effectively make possible the interaction between the user, learner or viewer with the video that affects the video's content. Administrative users or their video characters i.e., subject matter experts, instructors or facilitators as seen on the video, will have the ability to ask questions and dynamically receive immediate answers from either party.

Video production involves these three forms of art, pre-production arts, production arts, and post-production arts. Pre-production arts are all the art forms used before production including planning, writing, acting, and making production decisions. Production arts are the processes used to acquire the video assets and the post-production arts are the processes used to manipulate, arrange and rearrange the acquired video assets resulting in a finished product. Embodiments of SMV add unique interactive coding processes and on-the-fly editing techniques to video production and its traditional forms of art i.e., planning, writing, acting, making production decisions, acquisition, and editing, etc., in a novel manner redefining how these processes and art forms work together to create a plurality of finished video products and simulate live interactive dialog between live users and subject matter experts, instructors, and facilitators represented as video characters in any type of video but more specific corporate training videos.

Conventional video production thinking has been influenced and has evolved into its present "state of the arts" because of the transformation from analog video to digital video, and the subsequent advances in acquisition and editing technology. Video equipment prices, shapes, and sizes have dramatically dropped. New software, ways and techniques of using digital to create a richer video experience have emerged. Embodiments of SMV advance digital video art by providing video producers the production methodologies and technology tools to create videos that can directly exchange intellectual ideas between live users/learners and video-images of subject matter experts, instructors, and/or training facilitators through one-on-one virtual dialog.

In some embodiments of the invention, SMV video production planning differs from the traditional video production planning in that it must consider the purpose of the training video while strategically addressing the individual characteristic differences of audience members and assemble a plurality of stories made relevant to each individual audience members' personal training or employments or viewing needs as opposed to telling a singular story to an entire audience. The writing requirements for SMV scripts include (in some embodiments) making every video segment or scene result in a stand-alone scene that has a beginning, middle, and an end and that it is capable to be easily adapted to a plurality of relevant user content data. In some embodiments SMV video and traditional video use similar techniques for acting or making production decisions.

Corporate training producers have at least three choices for acquiring video assets, 1) using a video camera, or better yet, using a digital video camera, 2) creating the video assets using a computer and an accompanying 2D animation software such as Flash, Express Animator or any number of other animation software programs and/or Computer Generated Imagery (CGI), or a combination of all these systems. Animation packages, such as Flash have the ability to organize a large number of assets (such as characters, scenes, movements, and props) for later re-use and do much to enrich video content.

CGI is different from 2D animation software like Flash because it is not only creating animated images but also lifelike images in two-dimensional 2D and/or as three-dimensional 3D computer graphics for creating scenes and special effects in films and television. CGI has also led to virtual cinematography where multi-camera setup to photograph real objects and recreate them as three-dimensional objects and algorithms for automated creation of real and simulated camera viewpoints resulting in Virtual cinema used in movie, video game, leisure and disinformation industries. CGI has given birth to virtual worlds where by using camera moves and avatar control techniques that are not possible using traditional film making methods, real-time animation has been created.

SMV video assets can be created using any of these acquisition methods, or any other suitable methods. The decision as to which one of these methods are used is dependent on the judgment of the corporate training designer and producer as to the effects the video assets will have on the learners' transference rates directly related to the training, and obviously the training budget. Using a digital video camera with cost between $1,000 and $3,000 per finished minute is the least expensive method of acquiring the video assets. Flash or .swf formatted videos cost between $3,000 and $10,000 per finished minute and the best estimates for CGI place costs at about $5,000 to $20,000 per finished minute of full CGI.

Post-production or commonly known as editing is the process used to manually add graphics, and manipulate, arrange and rearrange the acquired video assets. The principal purpose or goal of the editing process is to put together the video assets into a cohesive storyline to inform or entertain viewers. Video assets are imported into a computer and editors use video editing software to remove unwanted footage, choose the best footage, create a flow to the video and its storyline, add special sound or video effects, graphics, music, and any other element needed, alter the style, pace or mood of the video, and give the video a particular angle which tailors the video to support a particular viewpoint, impact a message or serve an agenda.

The good storytelling purposes and goals of traditional editing and SMV editing remain essentially the same. In some embodiments of the invention, SMV differentiates itself from traditional editing in how, when and where, within the video production process, are decisions made, editing occurs, and video assets are assembled. Secondly, in some embodiments, SMV accounts for the inherent differences or nuances between viewers to tell the same story in a plurality of ways or stories individuals see on their computer, iPad, tablet, or smartphone screens. In preferred embodiments, SMV designers (within the pre-production phase of video production) develop editing "strategies" that are to determine how individual learners' personal data effects the acquisition, coding, and arrangements of the video assets for on-the-fly editing processes to insert the video assets into a plurality of associated playlists.

Training is the principal application but only the first envisioned by the Inventors because the Inventors anticipate a plurality of future applications to be developed by the inventors and others licensed with the technology. As an example, other embodiments of SVM may be used for academic or pedagogical purposes. Other embodiments of SVM may be used to walk users through complex or unknown procedures (e.g., following a recipe for baking, performing home repairs, or installing technical equipment). Still other embodiments of SVM may be used for entertainment purposes.

In creating video assets for training purposes or any types of multiple "one-to-one" viewing the planning process is where editing strategies are determined, and decided upon. This is possible because irrespective of purpose, be it subject matter training content, question, or answer, SMV segments, scenes or clips are (in preferred embodiments) to be designed but not restricted to small increments of 30 seconds to three minutes with each segment having a beginning (ACT 1), a middle (ACT 2), and an end (ACT 3) as is commonly practiced in the writing arts for video production of such things as stand-alone advertisements, and/or episodic short stories, etc. In other words, each segment, scene or clip is a story in and of itself.

In some embodiments, these segments comprise a plurality of (i) training content specific to the subject matter; (ii) questions to be asked by the subject matter expert of the users or learners specific to their individual personal training; (iii) answers to anticipated questions to be asked by the user, learner or viewer of the subject matter experts relative to the most immediate and specific segment viewed; and (iv) instructions on how to best use and interact or have dialog, i.e. Q&A communications with the training video.

Personal user/learner data that is to be considered in the writing process for producing specific training videos include but are not limited to employee categories such as the individual learner's (i) employment role e.g., staff, supervisor, or manager; (ii) seniority or experience i.e., new employee, veteran employee of 2-5 years, or well established member of 5 plus years; (iii) relative to the subject matter, how much training has the user had e.g., none, little, or extensive; (iv) what kinds of specific job training has the user had e.g., on the job, classroom, etc.; and (v) what learning style is best for the user e.g., listening, listening and seen, or doing.

Whether creating training courses for specific corporations or adapting video training content previously produced to a specific corporation, when possible the corporation should provide the producer or subject matter expert this employee data in advance of the video production. This way the need to ask any generic questions during the video training session is eliminated saving time, space and costs. It is an easy process to assign employee ID numbers to the data, ID numbers, which can then be used in some embodiments by the employee during the training session login process. Embodiments of SMV have the flexibility to set user data into its system in a number of ways.

In some embodiments, the producer or subject matter expert is only aware of specific employee categories, but does not know employer names or id numbers. This is advantageous because some companies may be hesitant to share this information with producers or subject matter experts. Additionally, basing decisions on category rather than employee number allows for flexibility as employees change what category they are in or as new employees are added. Other login procedures not relying on an employer number are also possible.

Once the relevant data is gathered and reviewed the scripts for all identified segments are written, which include "content scripts" and "Q&A scripts." Content scripts contain the body of information for the training as provided and delivered by the subject matter expert specific to the subject matter, what is to be taught, and the training purpose i.e. 1) generic, 2) cross-functional, 3) leadership or 4) topical or whatever defined purposes deemed necessary to engage learners. Q&A scripts are the questions with accompanying answers. Questions scripts are written for the subject matter experts to ask users/learners. Answers are written to answer anticipated questions that maybe asked by users/learners relative to the subject matter covered in the content of the training for each segment of content.

Whoever (Subject Matter Expert, or professional writer), is assigned to write the scripts can exercise their best creative writing skills as they would have exercised these skills for traditional video and/or training scripts. In a plurality of circumstances associated with the subject matter or topic, writers may experience the new challenge of incorporating the appropriate user data into their script writing, elevating writing skills.

Thereafter, a list of the segments is created accommodating space for a Video ID #, Segment #, Title or Keyword(s), Run Time, and File Size. See FIG. 4 for an exemplary Video Segment List.

In some embodiments, these lists will be coded and incorporated into the system and will be used to identify individual segments for use within the SMV process. Visual data needed to aid the training such as special effects, graphs, or images etc., are (in some embodiments) treated as content segments and are inventoried on the SMV Video Segment List. Specific music and special sound effects may be planned for, acquired and made part of each video segment as the specific segment is being produced irrespective to how the video assets are acquired, camera or computer. Additionally, certain visual aids may be made part of each video segment as the specific segment is being finalized. The number of video segments may depend on the complexity of subject matter to be taught, the number of instructor-led training sessions needed to explain the subject matter, the length of time allocated to complete the training, and the specific course design as is the case for traditional training video production.

In preferred embodiments, a strategic video-link map is the final pre-production item to be created and published. This map instructs the SMV system on how to select video segments, set the insertion sequence, and set timing. See FIG. 5 for an exemplary video link-map. This SMV Strategic Video-Link Map tool is the blueprint the technology follows to conduct on-the-fly editing as video segments stream to a plurality of user audio/video devices or players such as Real Player, QuickTime Player, Yahoo Messenger, and AirPlayer, etc., located in PCs, MAC computers, tablets, smartphones or as may be created, future communications devices, and streaming technologies.

Figure 5:
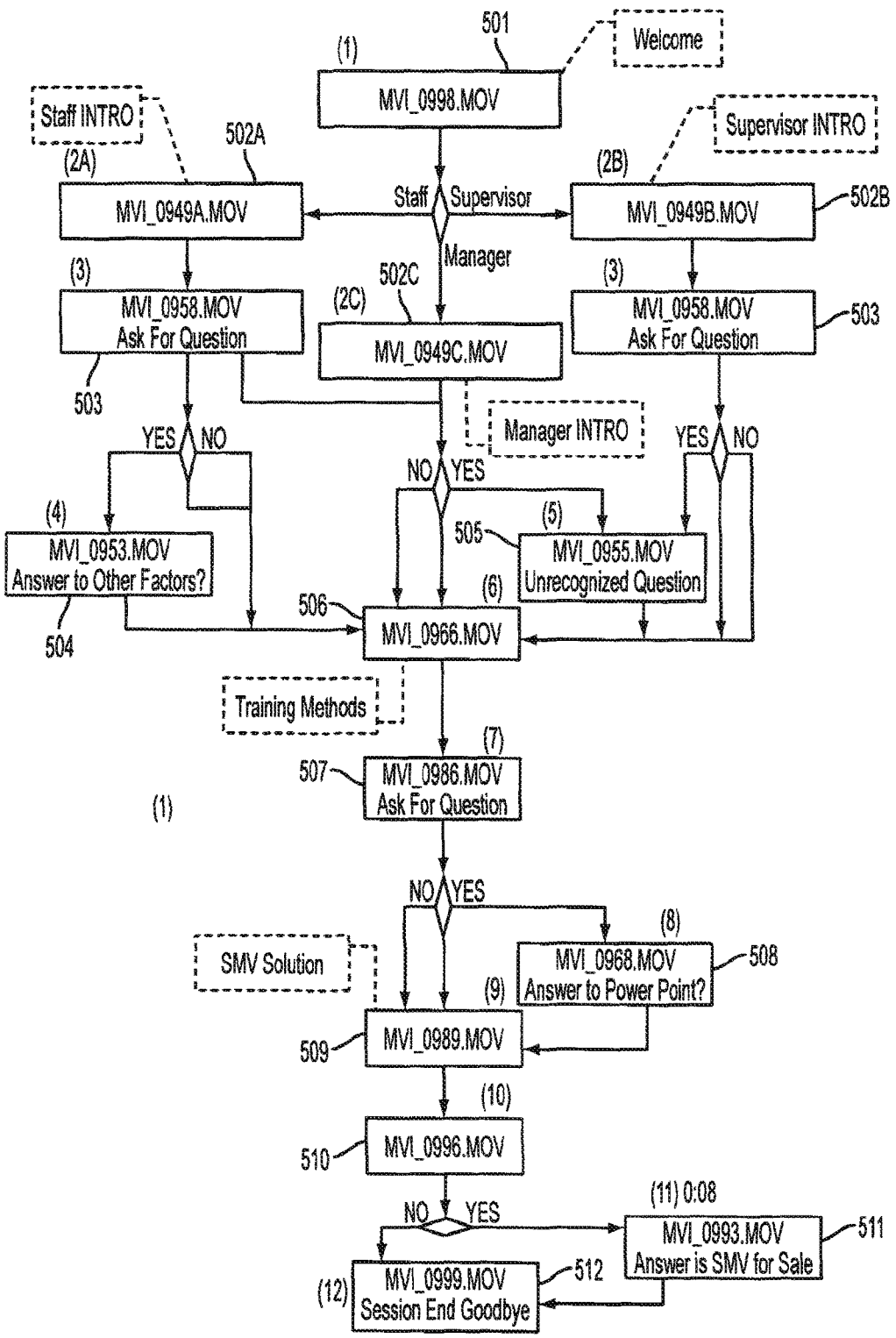
FIG. 5 presents a strategic video link-map according to an exemplary embodiment of the invention.

FIG. 5 is an exemplary Strategic Video-Link Map. In combination with the Video Segment List represented in FIG. 4, the SMV system knows how to edit the sample video for plurality of users. According to some embodiments of the invention the client company had previously (before the SMV production was begun) provided the training designer, subject matter expert, instructor, and SMV personnel the necessary personal data of its employees as to whether the employees taking the training are staff, supervisors or managers, etc., of the company; and any necessary employee identification information such as employee ID numbers. In some embodiments, the information provided may include categories of employees to be trained. With that understanding any knowledgeable professional persons such as business managers, engineers, computer science technicians or scientists, software programmers or coders, as well as, video production artists and video production professionals can clearly know enough to replicate the system or have the system replicated.

As a general example, using the Strategic Video Link-Map of FIG. 5, here is how the system works internally according to some embodiments. SMV tools necessary to run the system, as well as, the client's video assets and the provided personal employee data are loaded into the system using whatever commonly used set-up methods are incorporated into the client's computer system and Internet or Intranet browsers or other designated network e.g. Cloud, by the subject matter expert or its designee. The client's specific video segment list and the strategic video-link map are coded into the SMV tool. Users log onto the system using their employee ID numbers or other suitable authentication method.

According to some embodiments, and with reference to the specific link map provided in FIG. 5, the following describes the SVM process. SMV assembles a playlist of the video assets based on employees' personal data provided by the client company, surveys completed by users/learners corresponding to employees' ID numbers. Video segment labeled (501) (ID# MVI_0998.MOV, Segment #00.0, Titled Welcome Opening Instructions), on the video-link map is streamed for a period of 20 seconds. This video welcomes the user providing any necessary instructions on how to use the video, and is displayed to all users.

Without delay video segments labeled (502A) (Video ID# MVI_0949A.MOV, Segment #001.A0, Titled INTRO to SMV (Staff)), (502B) (Video ID# MVI_0949B.MOV Segment #001.B0, Titled INTRO to SMV (Supervisor)), and (502C) (Video ID#MVI_0949A.MOV Segment #001C.0, Titled INTRO to SMV (Manager)) are selected based on the appropriate employee category, each streamed for approximately 2 minutes and 40 seconds introducing the instructor, the subject matter, and specifically in a personalized manner; that is, video segments are streamed in relationship to the video content that distinguishes the users by their employee ID# numbers or other identifier as to which employees are (502A) staff members, (502B) supervisors, and (502C) managers.

Video segment labeled (503) (Video ID# MVI_0958.MOV Segment #001.0, titled Ask if Learner has any Questions) is streamed for 19 seconds. For those users/learners who desire to ask a question they are instructed to click the letter Q on their keyboard or clearly say the word "Question" into their computer microphone(s) or headset(s) when or if they are using voice directed SMV systems. Alternatively, when voice-directed systems are being used, the user can simply ask a question and the system will detect that a question has been asked using natural language processing and speech recognition techniques. When a user or a SME asks a question and an answer is given in response to the question a Q&A sequence is created then made part of the user's data for future assessment, follow-up, identification, and reference. (Future use of the data refers to the system's learning-to-learn techniques and methods.) Q&A sequences information provides to the SME areas the user may have difficulties in understanding the subject matter and may prove critical to improving the user's learning transference rate. If users/learners continue to have difficulties in understanding the information the system will provide the user/learner the opportunity to communicate with the SME or instructor for further explanation.

SMV technology makes available, in some embodiments, the capability of being keyboard directed and/or voice directed using a plurality of existing input devices, such as, keyboards, voice recognition systems, mice, eye-tracker commands, touch gestures, etc. It is anticipated that voice directed SMV systems are to be the dominant system chosen.

In some embodiments, should the client company request, assessment test and scores can be written, inserted and made part of any training video.

In some embodiments, analytics of users' Q&A sequence information are part of the technology tools used to provide users feedback, as are the scores of any assessment tests structured, coded, inserted for individual user sessions into and administered by the SMV program for a specific company training course.

In the present example as illustrated in FIG. 5, if a specific question containing the keywords or keyword phase "other types of factors" is asked video segment labeled (4) (Video ID# MVI_0953.MOV Segment #001.A2, Keyword(s) "Other"/"Types"/"Factors") will be streamed for 0:15 minutes only to the individual(s) who asked the question containing these keywords. In the case where a user asks a question that contains the keywords or keyword phrase "manage human factors" video segment labeled (505) (Video ID# MVI_0955.MOV Segment #001.AU, Keyword(s) "Undetectable"/"Unrecognized Question") is streamed for 0:16 minutes again only to that individual user who asked that question. SMV can simultaneously conduct this technique of having specific individual question and answer (Q&A sequence) sessions with a dispersed plurality of users. Beyond the use of simple keyword-spotting to select a segment responsive to a user-initiated question, the embodiments of the invention also use natural language processing and other machine-learning techniques to employ a more sophisticated selection.

SMV technology exclusively teaches the techniques of having the user or the subject matter expert (represented as an image on the screen) conduct "direct dialog" in questions and answers (O&A) sequence sessions described herein. It is of special note that these techniques are applicable beyond the described Q&A sequence sessions and more broadly applicable to direct intellectual conversations or exchanges between live person users and video characters as seen on video screens or other devices used for video viewing. Additionally, these SMV direct dialog techniques, and O&A sequence sessions techniques or any similar techniques have NOT been previously taught and are UNOBVIOUS to or in any previous teachings of the Art of Video Training, the Art of Video Production or any video art of similar nature.

In embodiments of the present invention, SMV creates a relevant Q&A sequence session when the letter Q is clicked on the keyboard or the word Question is spoken into a computer microphone of headset or an equivalent command recognized by the input device being used. The equivalent command to initiate a Q&A sequence can include the user asking the question, which the system can recognize as being a question. After the responsive video segment that answers a question is streamed for the specific user asking the question, and in the event that that question is asked during the streaming of the "content" video segment, such as but not limited to the segments labeled (502A), (502B) or (502C), the streaming video will be interrupted by the relevant Q&A sequence; afterwards, SMV returns to the time slot where the video segment was interrupted. If the question is asked at the completion of the "content" video segment or at the completion of an "Ask if learner has any Question" segment such as video segment labeled (503) referenced earlier, SMV advances by streaming for 2:36 minutes the next video segment labeled (506) (Video ID#

MVI_0966.MOV Segment #002.0, Titled Training Methods) from the playlist as directed in the sample Strategic Video-Link Map FIG. 5. In the case where no question is asked and a relevant Q&A session is not created, at the conclusion of whatever the video segment ie. (507) that was being streamed SMV automatically streams the next segment as directed by the Video-Link Map.

Natural Language Processing (NLP) and Artificial Intelligence (AI) techniques are used to ensure that answers to questions asked by Learners are properly associated to the answer videos resident in the SMV video database and instructional videos should any question(s) asked by Learners not be resident in the system database. Just as well, the system uses NLP and AI techniques to identify achievement levels demonstrated by learners' answers to the assessment questions in comparison to the correct answers as defined by the system's Subject Matter Experts', et al. and associated to any necessary subject Matter Experts', et al., response instructional videos should the Learners not achieve satisfactory levels.

In its continuance, the system replicates and repeats streaming segments as directed by and illustrated in FIG. 5 and automatically creates relevant interactive dialog Q&A sequence sessions as explained above.

Once the streaming of segment (506) has been completed, the "Ask if learner has any Question" video segment (507) (Video ID# MVI_0986.MOV Segment #002.0, titled Ask if Learner has any Questions) streams for 0:12 minutes, a relevant Q&A session is created by the user when asking a question and having it answered by streaming for 0:16 minutes segment (508), (Video ID# MVI_0968.MOV Segment #002.A2, Keyword(s) "Power"/"Point"/Factors") upon the completion of streaming video segment (508) SMV begins streaming video segment labeled (509) (MVI_0989.MOV Segment #003.0, titled SMV Solution) for 1:45 minutes. If the user does not initiate the Q&A sequence SMV immediately defaults to streaming video segment labeled (509).

At the conclusion of streaming video segment (509) (unless the video segment is interrupted by the users asking a question) SMV streams the video segment labeled (512) (MVI_0999.MOV, Segment number 003.A4, titled Session End). Should the user ask a question after the streaming of segment (510) the system would stream the segment labeled (511), (MVI_0993.MOV, Segment #003.A1, Keyword(s) "In the market"/"for sale"/"market"/sale"). Once the user's question is answered the segment labeled (512) is streamed for 0:20 minutes and concludes the entire session.

At the completion of the pre-production phase for SMV production the video strategies have been identified and established; video scripts have been written; a Video Segment List has been published; and the Strategic Video Link-Map has been completed.

Video assets acquisition or the video production phase for SMV is not much different than today's digital video production for some practitioners. Practitioners of the art, such as actors, directors, set designers, grips, and most importantly videographers, etc., conduct their activities as normal with one exception. In preferred embodiments of the invention, videographers must have an understanding and working knowledge of digital video technology and the cost containment of the Zero Editing concept to video assets acquisition. Zero Editing requires videographers to meticulously select techniques, formats, and other elements or processes that eliminate or minimize postproduction-editing time. This cost containment approach acts as an incentive to meet the challenge of solving the cost problems associated with video production for videographers For example, digital cameras and their accompanying software provide many options; i.e. most DSLR cameras offer videographers a choice in video size and quality i.e. 320×216 (3:2), 640×424 (3.2), and 1280×720 (16.9). Experienced videographers know that the quality formats selected should reflex the "use" of the video. In this respect SMV is no different than any other video shooting. Since more and more corporate training is conducted on the web a standard format should work fine.

High-definition files are too large to post straight from the camera onto a website. The frame must be resized and the data compressed once more in order to playback smoothly over the Internet. Format settings of 640×424 maybe small enough for Internet streaming while still providing quality web viewing; and this video setting is best for interviews or scenes that have few details and no movement much like instructor-led training. It allows videographers to skip some of the postproduction steps and is well suited for SMV Zero editing video production concept.

The technique of using high-definition video then resizing the video can be used with SMV because the videographer can do the resizing to 480×270 or down resolution, and it doesn't involve a separate postproduction-editing step. However this down resolution technique adds what maybe several unnecessary costs.

Traditional postproduction differs greatly from preferred embodiments of SMV. Normally video editors access their edit suites to make editing decisions, manipulate, and assemble various video clips into a singular storyline and video. However, just dealing with and manipulating the massive plurality of DVSM data, varying video content, user and SME questions, and answers segments with SMV would be problematic, very time consuming and near impossible to manage.

Three facts differentiate preferred embodiments of SMV from other types of editing. During the pre-production phase, the SME or the training course designer make editing decisions which are compound decisions in that they are determined in part by the user's training needs and/or learning styles. Secondly, the actual assembly of the personalized video segments is conducted "on the fly" as the segments are being streamed to a plurality of "individual" users by the SMV technology. Unlike the way videos are assembled in traditional postproduction and editing where editors assemble all the video segments or clips into a singular video then broadcast to a plurality of users. Third and critically important is that the storyline is customized for the individual users based on their individual data that is acquired before or can be acquired during the streaming of the requested video(s). In essence, these three facts make traditional video editing unnecessary.

Figure 6:
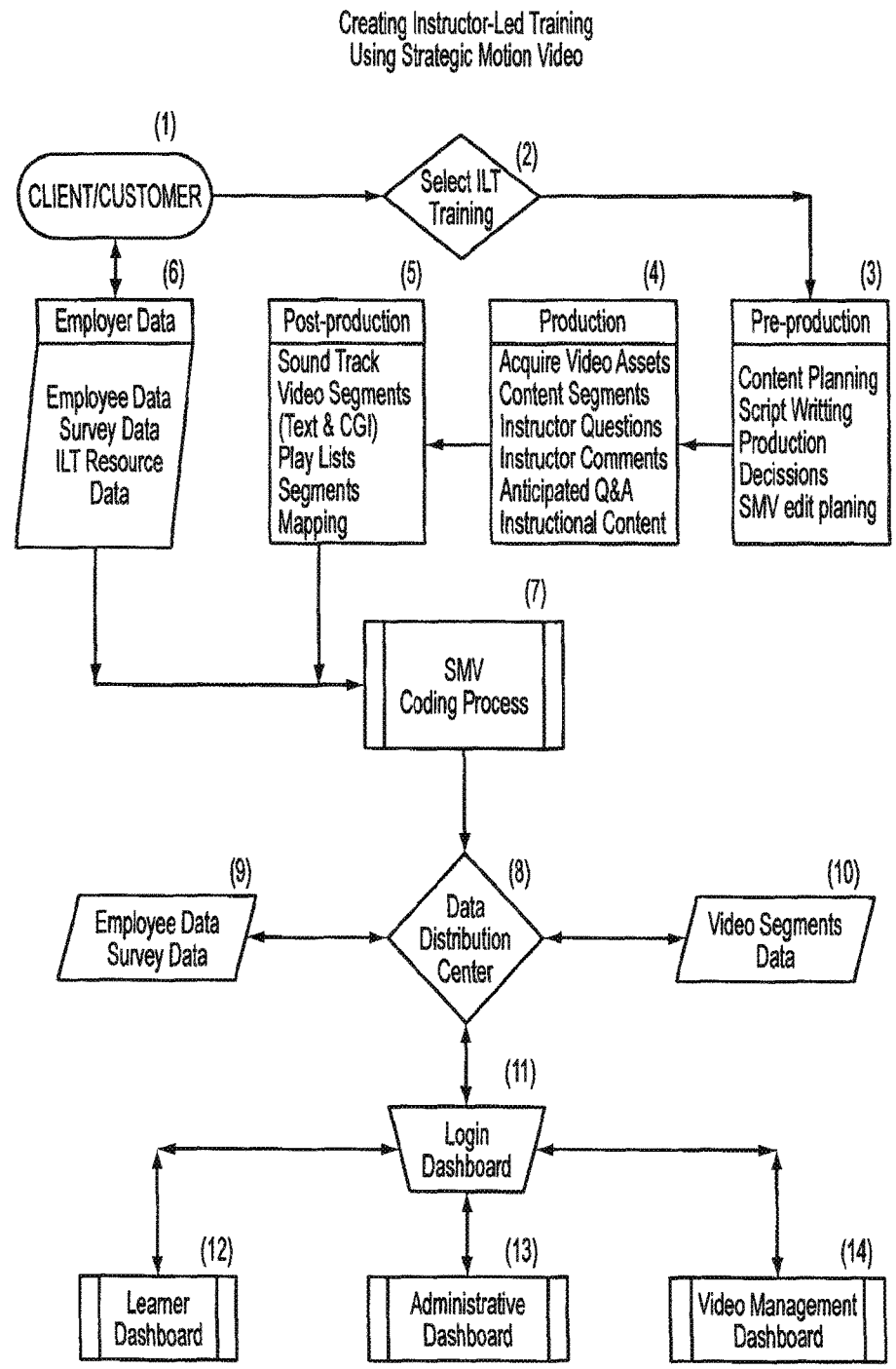
FIG. 6 is a flow diagram of the SMV video production process according to an exemplary embodiment of the invention.

FIG. 6 represents a flow chart of an exemplary embodiment of the SMV video production process. It begins with the Client/Customer (1) i.e., training designer and/or creator or system user, making a decision as to what Instructor-Led Training (ILT) course type or types (2) is needed. Once that decision is made Per-production (3) is the next step. Pre-production is comprised of content planning, scripting writing, production decision making, and SMV edit planning. Content planning, and production decision-making, and storyboarding are no different than in traditional pre-production activities. However, in preferred embodiments, scripting writing, and SMV edit planning are entirely different for three reasons. (a) To meet a necessary SMV coding and design protocol, video segments, episodes, clips or scenes are not to exceed three (3) minutes in length irrespective to the total length of the complete video content; (b) the purpose of this SMV design protocol is ensure that video content segments are strategically coded to personalized learner profiles as defined by course or course designer, and (c) to meet a created set of standardized procedures for storing and/or transmitting data, especially data used in regulating data between the personal data and the systems' other databases to properly respond to a plurality of users' requests for data transmission.

Once pre-production activities are complete and a project has been given a green light Production (4) activities to acquire video assets begin. The assets include, but are not limited to, content segments; instructor questions segments, instructor comments to learner responses, anticipated learner Questions & Answers, instructional content, and whatever other video assets are determined necessary to augment or customize the training course, etc. In some embodiments, SMV Post-production (5) differs from traditional post-production in that editing is limited to adding a soundtrack and limited amounts of Text & CGI. Creating playlists (see FIG. 4) and video link-maps (see FIG. 5) are the principal post-production activities. The other traditional activities of editing e.g., putting together video clips, episodes, scenes and/or segments into a singular video to be broadcasted are not necessary. Using the playlists and video link-maps these assembly activities are conducted and micro-casted (on the fly) by the SMV system when learners login to request their specific video training courses. Post-production video assets e.g., video segments, play lists, and segment maps as well as, Employer Data (6) e.g. employee data, survey data, and ILT Resource Data are entered into the SMV Coding Process (7). The SMV Coding Process is a set of coding templates where input of video segments, learner data and informational or system instructional data is coded, prepared and sent to an automated data distribution center. The Data Distribution Center (8) is tasked with storing Employee and Survey data (9) and the Video Segments Data (10) in appropriate locations, as well as, using playlists and video link-maps to retrieve, assemble and distribute the data through the Login Dashboard (11) to the Learner Dashboard (12), the Administrative Dashboard (13) or the Video Management Dashboard (14) as requested by and sent to the appropriate user.

Figure 7:
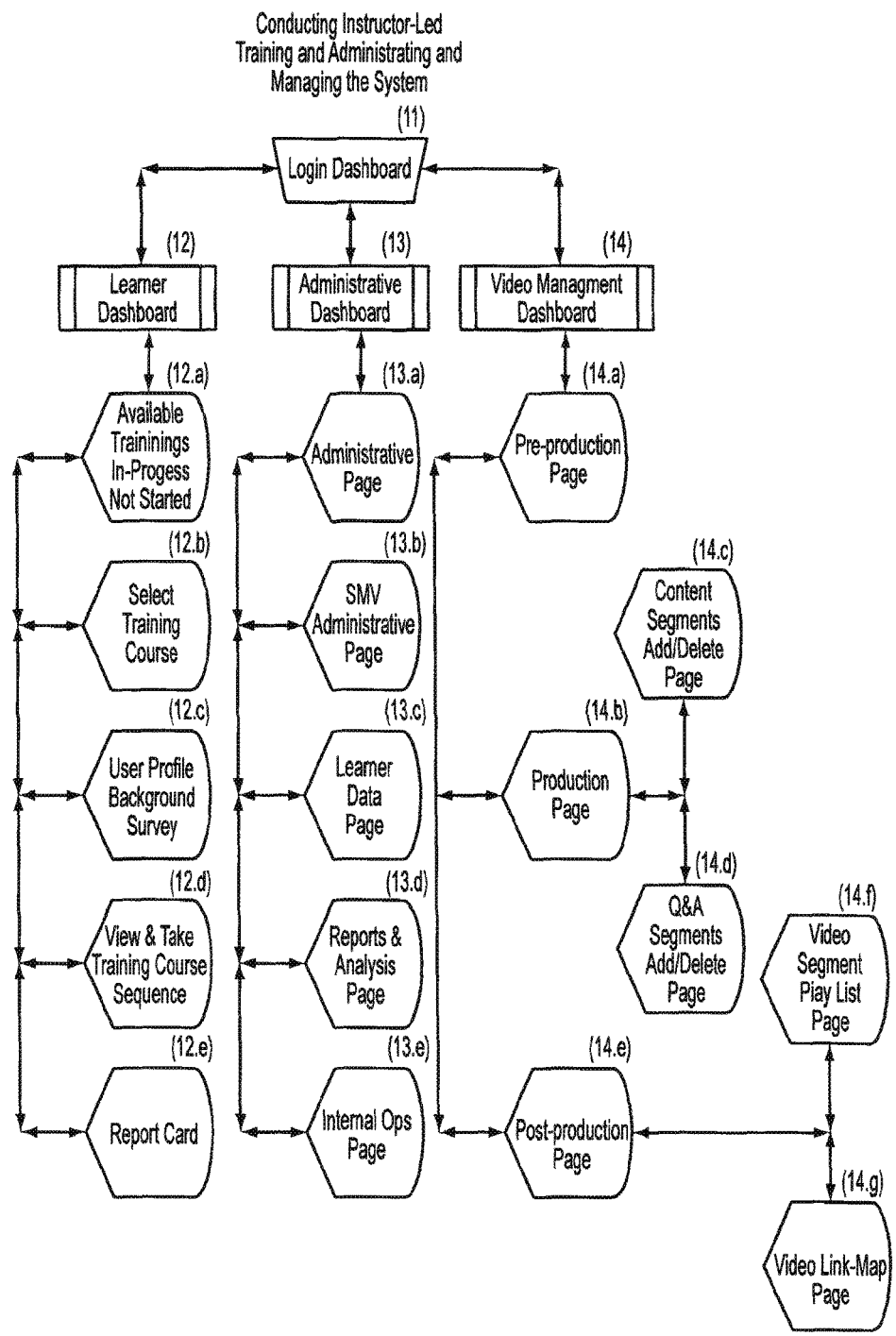
FIG. 7 presents a diagram of SMV dashboards according to an exemplary embodiment of the invention.

FIG. 7 outlines and teaches how users interact with the SMV Dashboards according to an exemplary embodiment of the invention. Users activities begin at the Login Dashboard (11), which navigates users, e.g., learners, administrators, and video managers to the appropriate pages they seek to conduct certain activities$^{(n)}$. The numbers of activities, as other system elements$^{(n)}$, illustrated in FIG. 7 serve only as example(s). Actual numbers of activities$^{(n)}$ or other system elements$^{(n)}$ is dependent on how training course(s) are designed relative to the actually required activities$^{(n)}$ or elements$^{(n)}$ to achieve the administrative or video management or training objectives.

Illustrated in FIG. 7 are the Learner Dashboard (12), Administrative Dashboard (13), and Video Management Dashboard (14). Each dashboard may be manually accessed at the Login Dashboard (11) and users may simply select specific activities and provide the user passcode(s) that were assigned to the user. Learners are provided access to the Learner Dashboard (12), administrators the Administrative Dashboard (13), and video managers Video Management Dashboard (14), etc.

In one embodiment, Learner Dashboard (12) allows learners to navigate to and see all Available Trainings (12.a) either in-progress or not started, Select a Training Course (12.b), review their User Profile or take a Background Survey (12.c), View & Take the Training Course Sequence (12.d), and view a Report Card (12.e) for each course the learner has completed.

In one embodiment, Administrative Dashboard (13) allows administrators to navigate to and review all available learner summary information or data on each learner and change such things as learner Q&A session structure, ILT assessment questions and answers, keywords at the Administration Page (13.a), at the SMV Administrative Page (13.b) administrators will be able to change, add or delete, or upgrade SMV functional elements, at the Learner Data Page (13.c), client learner data is accessible to management to make status changes to employee data such as add or delete and/or account for any significant employee changes, etc., at the Reports & Analysis Page 913.d) client management can configure or reconfigure the reports provided by the systems to more closely reflect their objectives, and at the Internal Ops Page (13.e) the administrator can select SMV voice or keyboard operations.

In one embodiment, the Video Managements Dashboard (14) provides access to video pre-production, production, and post-production activities. Administrative users will be able to review and affirm the planning strategies and objectives, script strategies and writing objectives, production objectives and decisions made during the pre-production period that are working. If the strategies or decisions are not working, then make whatever adjustments are necessary to any unproductive strategies or decisions at the Pre-production Page (14.a).

In one embodiment, during production, at the Production Page (14.b) administrative users can install any type of video content, i.e., informational, training, and/or Q&A content by navigating to the Informational Content Add/Delete Page (14.c), add or delete segments at the Course Content Add/Delete Page (14.d), and add or delete segments at the Q&A Segments Add/Delete Page (14.e).

In one embodiment, at the Post-production Page (14.h) administrative users can access and review specific course(s) play list(s) and link-map(s) by requesting a list of all courses and navigating to the desired course(s) Video Segment Play List Page (14.g), and the Video Link-Map Page (14.h)

As illustrated in these discussions and teachings, in combination, all SMV processes, properties, methods, techniques, and technology present a novel system that introduces new approaches, methods, techniques, technology, and benefits heretofore not existent in the art of video production. Video producers and SMEs will have a cost effective interactive video production tool previously unavailable. Users, i.e., Learners, Subject Matter Experts, Training Designers and Instructors will virtually step into a world where "direct dialog" with video images can be achieved via keyboard operations or voice, and video training can be personalized to the user's characteristics, learning styles, and needs. The benefits of which can be measured in lower cost for instructor-led training resulting in improved learning transference and retention rates that can be observed on the job by the performance of the SMV trained employees.

Figure 8:
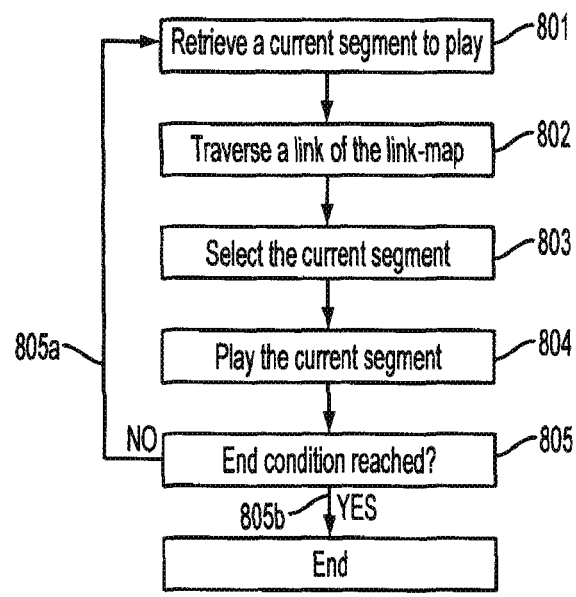
FIG. 8 is a flow diagram of a method of presenting video according to an exemplary embodiment of the invention.

Referring now to FIG. 8, a flow chart of a method of presenting a video according to an exemplary embodiment of the invention is shown. At step 801, the method retrieves a current segment to play for a user associated with a user category. The retrieving comprises traversing a link of the link-map based on the user category (step 802). The retrieving further comprises selecting the current segment to play from the plurality of segments based on traversing the link-map (step 803). At step 804, the method plays the current segment. Next (step 805), if an end condition is reached (805b), the method terminates. If an end condition is not reached (805a), the method repeats the retrieving and playing steps.

In embodiments where a processor is included, computer readable program code (CRPC) may be stored in a computer readable medium, such as, but not limited, to magnetic media (e.g., a hard disk), optical media (e.g., a DVD), memory devices (e.g., random access memory), and the like, or stored in the cloud. In some embodiments, computer readable program code is configured such that when executed by a processor, the code causes the processor to perform steps described above (e.g., steps described above with reference to the flow charts shown in FIG. 8).

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

We claim:

1. A computer-implemented method for presenting a video using a link-map, wherein the link-map comprises a plurality of segments and a plurality of links between segments, wherein each link is associated with a user category, the method comprising:
    retrieving a first segment to play for a user associated with a user category, the retrieving comprising:
    traversing a link of the link-map based on the user category; selecting the first segment to play from the plurality of segments based on traversing the link-map;
    receiving a user response to a first system-initiated question, wherein the first system-initiated question was programmed into the link-map; and
    selecting a second segment to play based on the user response to the first system-initiated question;
    playing the first segment after the step of selecting the first segment and the second segment after the step of selecting a second segment; and
    repeating the retrieving and playing steps until an end condition is reached; wherein the first segment comprises a first video content and the second segment comprises a second video content;
    wherein each segment comprises an identifier associated with its respective video content type, motion content, and suitability for insertion in a sequence of segments;
    wherein the step of selecting the first segment comprises coordinating the identifier of the first segment with the user category associated with the traversed link, and
    wherein the step of selecting the second segment comprises automatically coordinating the identifier of the second segment with the user response.

2. The method according to claim 1, wherein retrieving the first segment to play further comprises:
    detecting a user-initiated question;
    selecting a segment to play responsive to the user-initiated question; and
    playing the responsive segment.

3. The method according to claim 1, wherein playing the first segment further comprises:
    detecting a user-initiated question at a location within the first segment;
    determining an interrupting segment to play responsive to the user-initiated question;
    playing the interrupting segment; and
    resuming playing the first segment at the detected location.

4. The method according to claim 1, wherein the second segment to play is a pre-recorded answer to an anticipated question.

5. The method according to claim 1, wherein retrieving the first segment to play further comprises:
    determining dynamically that a second system-initiated question should be played, wherein the second system-initiated question is not programmed on the link-map;
    playing the second system-initiated question;
    receiving a user response to playing the second system-initiated question; and
    selecting a third segment to play based on the user response.

6. The method according to claim 5, wherein the second system-initiated question comprises an assessment test.

7. The method according to claim 2, wherein selecting the segment to play responsive to the user-initiated question comprises using one or more of natural-language processing techniques and artificial intelligence techniques.

8. The method according to claim 5, wherein determining dynamically that the second system-initiated question should be played is based on a current user session, including the number and content of any user-initiated questions, responses to any system-initiated questions and tests, and any user-specific settings.

9. The method according to claim 8, wherein determining dynamically that the second system-initiated question should be played is further based on a history of previous user sessions.

10. The method according to claim 5, wherein determining dynamically that the second system-initiated question should be played is based on how recently the subject matter of the question was presented to the user, in order to facilitate memorization.

11. The method according to claim 5, wherein selecting the third segment to play based on the user response comprises one of selecting a follow-up system-initiated question to be played; selecting a segment related to the user response; and selecting a segment based on traversing the link-map for the user category.

12. The method according to claim 1, wherein playing the current first segment comprises streaming the segment online.

13. The method according to claim 1, wherein the user category is based on one or more of an employment role, a seniority level, a subject-specific experience level, a history of job-training, and a learning style.

14. The method according to claim 1, wherein one or more of the plurality of segments comprises one or more of special effects, graphs, images, and animations.

15. The method according to claim 1, wherein detecting a user-initiated question comprises using one or more of natural language processing, speech recognition, and artificial intelligence techniques.

16. The method according to claim 1, wherein the video is a Strategic Motion Video (SMV).

17. The method according to claim 1, wherein the end condition is programmed on the link-map.

18. The method according to claim 1,
wherein the first video content comprises training content to teach a course corresponding to the user category;
wherein the first system-initiated question comprises generating a message asking if the user has any questions; and
wherein the second video content comprises a pre-record answer to an anticipated question.

19. The method according to claim 1, wherein the identifier comprises a code, a tag, or a flag.

20. The method according to claim 1,
wherein the first video content comprises training content to teach a course corresponding to the user category;
wherein the first system-initiated question comprises an assessment test based on the training content; and
wherein the second video content comprises feedback based on the user response to the assessment test.

21. A device for presenting a video using a link-map, wherein the link-map comprises a plurality of segments and a plurality of links between segments, wherein each link is associated with a user category, the device comprising: a processor;
a memory coupled to the processor; and a network interface coupled to the processor, wherein the processor is configured to:
retrieve a first segment to play for a user associated with a user category, the retrieving comprising:
traversing a link of the link-map based on the user category; selecting the first segment to play from the plurality of segments based on traversing the link-map;
receiving a user response to a first system-initiated question, wherein the first system-initiated question was programmed into the link-map; and
selecting a second segment to play based on the user response; play the first segment after the step of selecting the first segment and the second segment after the step of selecting a second segment; and
repeat the retrieving and playing steps until an end condition is reached;
and
wherein each segment comprises an identifier associated with its respective video content type, motion content, and suitability for insertion in a sequence of segments;
wherein the step of selecting the first segment comprises coordinating the identifier of the first segment with the user category associated with the traversed link, and
wherein the step of selecting the second segment comprises automatically coordinating the identifier of the second segment with the user response.

22. A non-transitory computer program product for presenting a video using a link-map, wherein the link-map comprises a plurality of segments and a plurality of links between segments, wherein each link is associated with a user category, the computer program product comprising:
program code for retrieving a first segment to play for a user associated with a user category, the retrieving comprising:
traversing a link of the link-map based on the user category; and selecting the first segment to play from the plurality of segments based on traversing the link-map;
receiving a user response to a first system-initiated question, wherein the first system-initiated question was programmed into the link-map; and
selecting a second segment to play based on the user response; program code for playing the first segment after the step of selecting the first segment and the second segment after the step of selecting a second segment; and
program code for repeating the retrieving and playing steps until an end condition is reached;
wherein the first segment comprises a first video content and the second segment comprises a second video content;
wherein each segment comprises an identifier associated with its respective video content type, motion content, and suitability for insertion in a sequence of segments;
wherein the step of selecting the first segment comprises coordinating the identifier of the first segment with the user category associated with the traversed link, and
wherein the step of selecting the second segment comprises automatically coordinating the identifier of the second segment with the user response.

* * * * *